United States Patent [19]

Lau

[11] Patent Number: 5,395,550
[45] Date of Patent: Mar. 7, 1995

[54] AMPHIPHILIC TELOMERS

[75] Inventor: Aldrich N. K. Lau, Palo Alto, Calif.

[73] Assignee: Raychem Corporation, Menlo Park, Calif.

[21] Appl. No.: 222,149

[22] Filed: Mar. 31, 1994

[51] Int. Cl.⁶ .................. C09K 19/52; F21V 9/00; G02F 1/13
[52] U.S. Cl. .................. 252/299.01; 252/582; 359/52
[58] Field of Search ............ 252/299.01, 582; 359/52

[56] References Cited

U.S. PATENT DOCUMENTS

| | | | |
|---|---|---|---|
| 4,435,047 | 3/1984 | Fergason | 350/334 |
| 4,460,480 | 7/1984 | Kleiner et al. | 252/8.05 |
| 4,685,771 | 8/1987 | West et al. | 350/347 |
| 4,950,052 | 8/1990 | Fergason et al. | 350/334 |
| 4,992,201 | 2/1991 | Pearlman | 252/299.1 |

FOREIGN PATENT DOCUMENTS

| | | | |
|---|---|---|---|
| 0313053A | 4/1989 | European Pat. Off. | G02F 1/133 |
| WO93/18431 | 9/1993 | WIPO | G02F 1/1333 |

OTHER PUBLICATIONS

Battais et al, Eur. Polym J., vol. 19, No. 6, pp. 499–505 (1983).
Bertrais et al., Eur. Polym. J., vol. 18, pp. 785–790 (1982).
Scott et al., Macromolecules, vol. 2, No. 4, pp. 428–431 (1969).
Rondestvedt et al., J. Org. Chem., vol. 42, No. 16, pp. 2680–2683 (1977).
Boutevin et al., J. Polym. Sci. Polym. Chem. Ed., vol. 19, pp. 511–522 (1981).
Scott et al., J. Org. Chem., vol. 29, pp. 83–86 (1964).
Boutevin et al., Makromol. Chem., vol. 183, pp. 2333–2345 (1982).
Starks, "Free Radical Telomerization," pp. 1–21 and 193–214 (Academic Press 1974).

Primary Examiner—Shean Wu
Attorney, Agent, or Firm—Herbert G. Burkard; Yuan Chao

[57] ABSTRACT

Telomers of the structure

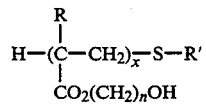

are disclosed, where R is —CH$_3$ or H; R' is a C$_5$ to C$_{18}$ alkyl or fluoroalkyl group; n is an integer between 2 and 6 inclusive; and x is an integer between 3 and 26 inclusive. These telomers are surface active and are useful as aids for coating applications.

12 Claims, No Drawings

AMPHIPHILIC TELOMERS

TECHNICAL FIELD OF THE INVENTION

This invention relates to telomers which are useful as coating aids in the preparation of liquid crystal light valves.

BACKGROUND OF THE INVENTION

Light valves having an electro-optically active element comprising a liquid crystal composite are known. In a liquid crystal composite, plural volumes or droplets of a liquid crystal material are dispersed, encapsulated, embedded, or otherwise contained within a matrix material such as a polymer. Exemplary disclosures include Fergason, U.S. Pat. No. 4,435,047 (1984); West et al., U.S. Pat. No. 4,685,771 (1987); Pearlman, U.S. Pat. No. 4,992,201 (1991); Dainippon Ink, EP 0,313,053 (1989). These light valves may be used in displays and window or privacy panels.

The liquid crystal composite is disposed between transparent electrodes, which are respectively supported by substrates (e.g., glass or a transparent polymer). When no voltage is applied across the electrodes (the field-off state), incident light is substantially scattered and/or absorbed. When an appropriate voltage is applied across the electrodes (the field-on state), the liquid crystal composite changes its optical state to one in which incident light is substantially transmitted.

The liquid crystal composite may be applied onto an electrode (and, if the electrodes do not entirely covered substrate, also to uncovered portions of the substrate) as an emulsion in an aqueous carrier medium. The carrier medium is allowed to evaporate, and an opposing electrode and substrate are laminated on top of the liquid crystal composite to form the light valve. Sometimes the emulsion coats poorly onto the electrode-substrate combination, leading to irregular coatings, cratering, pin-holing, streaking, irregular thicknesses, and other defects. Poor light valve performance may result. The addition of surfactants to the emulsion prior to coating can lead to better quality coatings. However, prior art surfactants have been found to adversely affect the electrooptical characteristics of the liquid crystal composite, such as lowering the voltage holding ratio.

Thus, it is desirable to develop coating aids which lead to higher quality coatings but which do not adversely affect the electro-optical characteristics of the liquid crystal composite.

SUMMARY OF THE INVENTION

This invention provides telomers of the structure

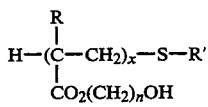

(I)

where R is —$CH_3$ or H; R' is a $C_5$ to $C_{18}$ alkyl or fluoroalkyl group; n is an integer between 2 and 6 inclusive; and x is an integer between 3 and 26 inclusive.

These telomers are useful as coating aids for the application of liquid crystal composites onto electroded glass or polymeric substrates, for fabrication into liquid crystal light valves. Accordingly, there is also provided a method of making a liquid crystal light valve, comprising the steps of:

(a) providing an emulsion comprising plural discrete volumes of a liquid crystal material encapsulated in a matrix material carried in an aqueous carrier medium, the emulsion further comprising a telomer of the structure (I);

(b) applying a coating of the emulsion onto a first electrode material supported by a first substrate;

(c) drying the coating by permitting the aqueous carrier medium to evaporate; and (d) laminating onto the dried coating a second electrode material supported by a second substrate.

DESCRIPTION OF THE PREFERRED EMBODIMENTS

The telomers of this invention are amphiphilic, that is, they possess both hydrophilic and hydrophobic functionalities. In the structure (I)

(I)

(where R, R', n and x are as previously defined) hydrophilicity is provided by the hydroxyalkyl group —$(CH_2)_n OH$. Preferred hydroxyalkyl groups are those in which n is 2 or 3, with 2 being especially preferred (i.e., hydroxyethyl). As a result of their amphiphilicity, they are surface active and can function as coating aids in the preparation of liquid crystal composite light valves. R is preferably H.

Hydrophobicity is provided by the R' groups, which may be linear or branched. Preferred R' groups are linear or branched $C_9$ to $C_{16}$ alkyl groups and fluoroalkyl groups of the structure —$CH_2CH_2(CF_2)_mF$, where m is an integer between 4 and 10, inclusive.

Exemplary specific preferred telomers according to the general structure (I) are shown below:

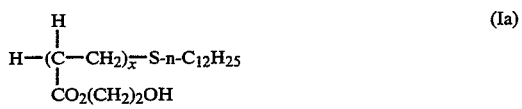

(Ia)

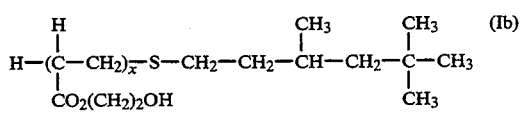

(Ib)

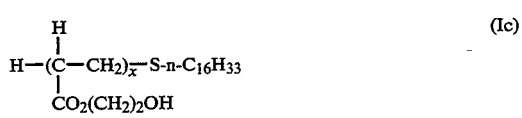

(Ic)

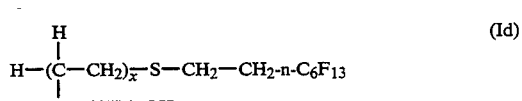

(Id)

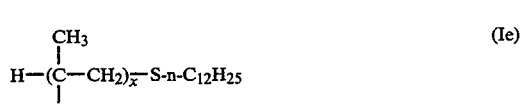

(Ie)

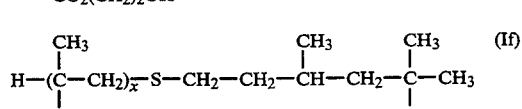

(If)

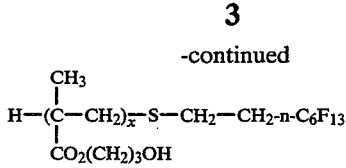

$$H-(\underset{\underset{CO_2(CH_2)_3OH}{|}}{\overset{\overset{CH_3}{|}}{C}}-CH_2)_{\overline{x}}-S-CH_2-CH_2-n-C_6F_{13} \quad \text{(Ig)}$$

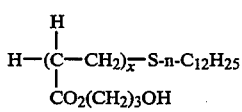

$$H-(\underset{\underset{CO_2(CH_2)_3OH}{|}}{\overset{\overset{H}{|}}{C}}-CH_2)_{\overline{x}}-S-n-C_{12}H_{25} \quad \text{(Ih)}$$

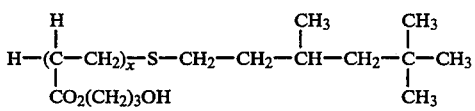

$$H-(\underset{\underset{CO_2(CH_2)_3OH}{|}}{\overset{\overset{H}{|}}{C}}-CH_2)_{\overline{x}}-S-CH_2-CH_2-\overset{\overset{CH_3}{|}}{\underset{\underset{}{}}{CH}}-CH_2-\overset{\overset{CH_3}{|}}{\underset{\underset{CH_3}{|}}{C}}-CH_3 \quad \text{(Ii)}$$

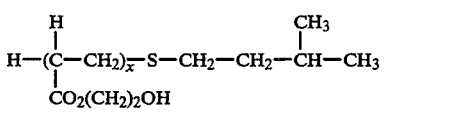

$$H-(\underset{\underset{CO_2(CH_2)_2OH}{|}}{\overset{\overset{H}{|}}{C}}-CH_2)_{\overline{x}}-S-CH_2-CH_2-\overset{\overset{CH_3}{|}}{\underset{\underset{}{}}{CH}}-CH_3 \quad \text{(Ij)}$$

Telomers may be viewed as tailored oligomers having defined end groups. They may be made by a free-radical telomerization reaction, in which a chain transfer reagent (or telogen) AB is reacted with more than one equivalent of a polymerizable monomer (or taxogen) M to form telomers A-(M)$_x$-B:

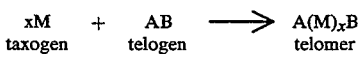

$$\underset{\text{taxogen}}{xM} + \underset{\text{telogen}}{AB} \longrightarrow \underset{\text{telomer}}{A(M)_xB}$$

In the context of this invention, the taxogen is hydroxy ester (II) and the telogen is an alkanethiol (III) (where R, R', x, and n are as defined above):

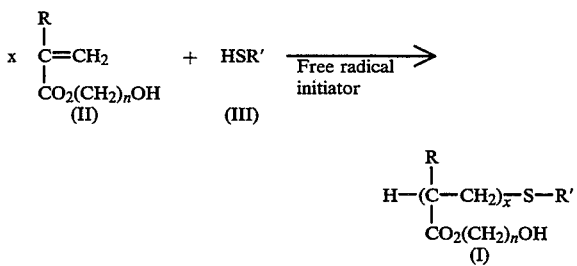

$$x \underset{\underset{CO_2(CH_2)_nOH}{|}}{\overset{\overset{R}{|}}{C}}=CH_2 + HSR' \xrightarrow[\text{initiator}]{\text{Free radical}}$$
$$(II) \quad\quad (III)$$

$$H-(\underset{\underset{CO_2(CH_2)_nOH}{|}}{\overset{\overset{R}{|}}{C}}-CH_2)_{\overline{x}}-S-R'$$
$$(I)$$

The free radical initiator may be one used for free radical polymerization or telomerization generally. A preferred initiator is 2,2'-azobisisobutyronitrile (AIBN). Telomerization may be effected in bulk at a temperature between 50° and 70° C. or in solution in the presence of a solvent such as dichloromethane. Alkanethiol (III) may be synthesized by treating the corresponding halide (IV) with thiourea and hydrolyzing the resulting thiouronium salt (V):

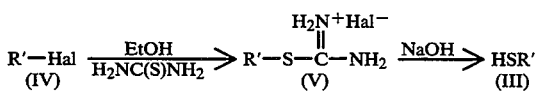

$$\underset{(IV)}{R'-Hal} \xrightarrow[H_2NC(S)NH_2]{EtOH} \underset{(V)}{R'-S-\overset{\overset{H_2N^+Hal^-}{\|}}{C}-NH_2} \xrightarrow{NaOH} \underset{(III)}{HSR'}$$

where R' is as previously defined and Hal is halogen (preferably bromine or iodine).

The solubility in water and efficacy of a telomer (I) as a coating aid are influenced by the degree of polymerization and the size of R'. For a given R', a higher degree of telomerization tends to increase miscibility with water. When R' is smaller than C$_8$, the surface activity of telomer (I) is decreased. Telomers which are completely miscible with water, forming colorless solutions therewith, are preferred.

The degree of polymerization in a telomerization reaction may be determined by the molar ratio of telogen to taxogen, per the Mayo Equation (Boutevin et al., J. Polym. Sci. Polym. Chem. Ed., 19, 511 (1981)):

$$\frac{1}{DP_x} = \frac{1}{DP_o} + C\frac{[AB]}{[M]}$$

DP$_x$ is the degree of polymerization with chain transfer reaction (i.e., with telogen present); DP$_o$ is the degree of polymerization in an ordinary polymerization reaction, without chain transfer reaction (i.e., no telogen present); C is a chain transfer constant characteristic of a given telogen; [AB] is the concentration of telogen; and [M] is the concentration of taxogen. Taxogens HSR' have high chain transfer constants.

Telomers (I) of this invention may be used as coating aids in the preparation of light valves made from liquid crystal composites (sometimes also referred to as encapsulated liquid crystal materials). In a liquid crystal composite, discrete volumes of a liquid crystal material are encapsulated, dispersed, embedded or otherwise contained in a matrix material. The volumes are not necessarily limited to spherical or substantially spherical ones. They may be irregularly shaped, and even interconnected. The amount of interconnection between volumes may be to an extent such that the liquid crystal material appears to form a continuous phase. "Liquid crystal material" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal material is nematic or operationally nematic. More preferably, it also has a positive dielectric anisotropy.

Individual liquid crystal molecules typically have elongated shapes, with a tendency to align themselves with their long molecular axes parallel to each other. This alignment causes a liquid crystal composition to be anisotropic, meaning that its measured physical, optical, and other properties are dependent on the direction of measurement (parallel or perpendicular to the direction of alignment). The alignment direction may be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

Generally the ordinary refractive index of the liquid crystal material is substantially matched to the refractive index of the matrix material. A colored visual effect may be obtained by inclusion of dyes, either pleochroic or isotropic, into the composite. The physical principles by which liquid crystal composite light valves operate is described in the art cited in the Background of the Invention section, especially Fergason, U.S. Pat. No. 4,435,047.

The matrix material is preferably a polymeric material. Suitable matrix materials include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred containment medium.

Liquid crystal composites may be made by deposition from an emulsion of the matrix material and the liquid crystal material, in the presence of a carrier medium. The emulsion may be made with apparatus such as propeller blade mixers, colloid mixers, and the like. Preferred emulsion techniques are taught in Fergason, U.S. Pat. No. 4,435,047 (1984), 4,606,611 (1986), 4,616,903 (1986), and 4,707,080 (1987); Pearlman et al., U.S. Pat. No. 4,992,201 (1991); Kamath et al., U.S. Pat. No. 5,233,445 (1993); and Warrenberg et al., U.S. Pat. No. 5,202,063 (1993) and WO 93/18431 (1993); the disclosures of which are incorporated herein by reference.

In the preparation of a light valve having a liquid crystal composite as the electrooptically active element, the emulsion is prepared and coated onto a substrate having an electrode material which partially or entirely covers the substrate. The substrate is typically made of a transparent material such as glass or a transparent polymer such as poly(ethylene terephthalate). The electrode material also is transparent, made for example of materials such as indium tin oxide (ITO), gold, or silver. (Substrate or electrode material disposed on a non-viewing side of the light valve need not be transparent.) To prevent coating defects as discussed hereinabove, a telomer (I) is added. Telomer (I) may be added to either the matrix material or the liquid crystal material, or both, before the emulsification process, or to the emulsion after it has been formed. Telomer (I) is added in an amount of between 0.05% and 2.00% w/w, preferably between 0.10% and 1.00% w/w. The use of excessive amounts of telomer (I) is undesirable, as further improvement of coating quality may not be obtained but electro-optical performance may degraded.

After the coating process, the carrier medium, which is generally aqueous in nature, is allowed to evaporate. The carrier medium may be water, or an alcohol-water combination, as taught in Wartenberg et al., U.S. Pat. No. 5,202,063 (1993). Once the carrier medium has evaporated, leaving behind the liquid crystal composite, an opposing electrode supported in turn by a second substrate may be laminated on top of the composite to produce the light valve.

While in principle other surface-active agents may be used to improve the coatability of the emulsion, I have found that they adversely affect the electro-optical characteristics of the light valve. Conversely, telomers (I) of my invention have unexpectedly been found to improve coatability without adversely affecting electro-optical characteristics such as voltage holding ratio, operating field, contrast ratio, rise time, and fall time. In some instances, the electro-optical properties are actually improved.

The practice of this invention may be further understood by the following examples, which are provided by way of illustration and not of limitation. Some general definitions and procedures are set forth below, before presentation of specific experimental work.

Optical measurements were obtained with f/3.5 collection optics and a collimated 550±40 nm light source. In order to measure $T_{90}$ and the operating field $V_{90}$ of a liquid crystal composite, samples were stepped up and down in voltage (25 steps up and 25 steps down with 0.7 sec per step) to a relatively high field (typically 8–10 V/μm). For each test, the maximum in transmission is defined as $T_{on}$, while $T_{off}$ is the percent transmission in the absence of applied voltage. The value $T_{90}$ is given by the equation $$T_{90} = 0.9(T_{on} - T_{off}) + T_{off}$$

The applied field needed to reach $T_{90}$ on the up curve is $V_{90}$ (the up curve being the % T/V curve obtained with increasing voltage). $E_{90}$ (in Volt/μm) is defined by $$E_{90} = \frac{V_{90}}{t}$$

where $V_{90}$ is in volts and t is the thickness in μm of the liquid crystal composite.

Hysteresis was measured in a test in which the sample was ramped 25 steps up then 25 steps down in voltage (0.7 sec per step), typically to a maximum voltage which applies the field $E_{90}$ to the film. The hysteresis is defined as $\Delta T/T_{avg}$ at $E_{50(avg)}$ where $E_{50(avg)}$ is the linear average of $E_{50(up)}$ and $E_{50(down)}$. $E_{50(up)}$ and $E_{50(down)}$ are the field needed to reach $T_{50}$ for the up and down curves, respectively. $T_{50}$ is defined by the equation $$T_{50} = 0.5(T_{on} - T_{off}) + T_{off}$$

$\Delta T$ is the difference in transmission between the up and the down curves ($T_{(E50(avg), down)}$ minus $T_{(E50(avg), up)}$) at $E_{50(avg)}$, and $T_{avg}$ is given by $$T_{avg} = \frac{(T_{(E50(avg), down)} + T_{(E50(avg), up)})}{2}$$

Switching speeds were obtained by giving a sample a 1 sec, 400 Hz square wave signal at $E_{90}$. The time for the sample to go from $T_{10}$ to $T_{90}$ is the rise time; the time for the sample to turn off from $T_{90}$ to $T_{10}$ is the fall time.

The voltage holding ratio (VHR) of liquid crystal composites was measured as follows. A sample of composite was mounted between two electrodes and a series of alternating polarity voltage pulses was applied. The pulses were 30–300 msec in duration and were applied every 15 msec. During the 15 msec hold time the sample was monitored. The voltage holding ratio (VHR) is defined as the percentage of the original applied voltage which remained at the end of the 15 msec hold time. The measurement was taken at "steady state", which for most samples was attained before 20 pulses. Large values of VHR are more desirable. Practical light valves preferably have a VHR which is at least 70%, more preferably at least 80%, and most preferably at least 90%.

Contrast ratio (CR) is defined by the equation $$CR = \frac{T_{on}}{T_{off}}$$

A figure of merit (FOM) may be defined by the equation $$FOM = \frac{CR}{V_{90} \cdot (f/\#)^2}$$

where f/# is the f-stop and has a value of 3.5. This figure of merit may be used to estimate the overall performance of a light valve, taking into account the operating voltage, the contrast ratio, and the system optics.

EXAMPLE 1

This example describes the preparation of bromide (IVb), a precursor for the synthesis of telogen (Ib).

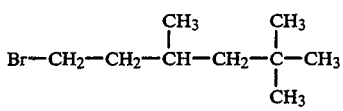

3,5,5-Trimethylhexanol (44.0 g, 305 mmol) was charged into a 200 mL three-neck flask equipped with a nitrogen inlet, an addition funnel, a thermometer, and a magnetic stirrer and was chilled to $-20°$ C. in a dry ice bath. With constant stirring, phosphorus tribromide (32.5 g, 120 mmol) was added dropwise such that the temperature of the reaction mixture never exceeded $-10°$ C. The reaction mixture was stirred at $-20°$ C. for 30 min. It was warmed up to 24° C. slowly and then stirred at ambient temperature for 16 hours. At the end of the reaction, distillation under reduced pressure afforded 38.4 g (61% yield) of bromide (IVb): bp 80°-5° C. (11 mm Hg). GC purity>95%. MS: m/e 149 (3.22%, M—$C_4H_9$), m/e 135 (1.0%, M—$C_4H_9$—$CH_4$), m/e 95 (0.9%, +$BrCH_2$), m/e 57 (100%, +$C_4H_9$). IR(neat on KBr): 2960, 2900, 2870, 1440, 1365, 1260, and 1215 $cm^{-1}$.

EXAMPLE 2

This example describes conversion of halide (IVb) to alkanethiol (IIIb).

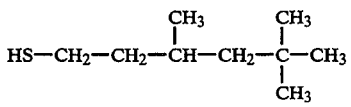

Halide (IVb) (30.21 g, 145.83 mmol), thiourea (12.50 g, 164.21 mmol), and anhydrous ethanol (100 mL) were charged into a 250 mL round bottom flask equipped with a water-cooled condenser, a magnetic stirrer, and a nitrogen inlet. The mixture was heated at a gentle reflux for 2 days. The solvent was removed under reduced pressure (approximately 16 mm Hg) at 60° C. to give an intermediate thiouronium salt. A solution of sodium hydroxide (5.0 g, 125 mmol) in water (100 mL) was added to thiouronium salt. The mixture was stirred at ambient temperature for 16 hr. It was heated at a gentle reflux for 30 min and then acidified to pH 1.0 with 2N aqueous sulfuric acid and then extracted with dichloromethane (250 mL). The organic layer was washed with three portions of 5% aqueous sodium chloride solution (150 mL each) and dried over anhydrous magnesium sulfate. The solvent was removed under reduced pressure (approximately 16 mm Hg) at 30° C. and the residue was subjected to fractional distillation to give 12.7 g (54% yield) of alkanethiol (IIIb): bp 195°-7° C. MS: m/e 160 (0.6%, M), m/e 103 (37%, M—$C_4H_9$), m/e 89 (1.9%, M—$C_5H_{11}$), m/e 61 (8.6%, M—$C_7H_{15}$), m/e 57 (100%, +$C_4H_9$), m/e 47 (22.1%, $H_2C$=$SH^+$).

More details on the above procedures may be found in Wartenberg et al., WO 93/18431 (1993), the disclosure of which is incorporated herein by reference.

EXAMPLE 3

This example describes the preparation of telomer (Ib).

Alkanethiol (IIIb) (4.81 g, 30.0 mmol), 2-hydroxyethyl acrylate (23.25 g, 200.22 mmol, from Polyscience), and AIBN (0.05 g, 0.26 mmol) were charged into a 250 mL round bottom flask equipped with a water-cooled condenser, a magnetic stirrer, and a nitrogen inlet. The mixture was de-oxygenated by blowing a fine stream of dry nitrogen over the solution surface for 10 min, with constant stirring. The reaction flask was then lowered into a 70° C. oil bath. Polymerization was carried out at 70° C. with stirring for 30 min. Unreacted taxogen and telogen were removed by vacuum distillation (0.5 mm) at 70° C. oil bath temperature to give 27.0 g of telomer (Ib). $^1$H-NMR integration of the product indicated the average degree of polymerization was 5.9. GPC (with tetrahydrofuran (THF) as the mobile phase and polystyrene standards) gave the following molecular weight values: number average molecular weight ($M_n$) 950 and weight average molecular weight ($M_w$) 2030.

EXAMPLE 4

This example describes the preparation of telomer (Id).

1H,1H,2H,2H-Perfluorooctanethiol (HS—$CH_2$—$CH_2$—$C_6F_{13}$, IIId) was prepared by the procedure of Rondestvedt et al., J. Org. Chem., 1977, 42, 2680, was followed. The identity of the product was confirmed by the following analytical data: bp 155°-7° C. (Rondestvedt reports 63°-4° C. at 20 mm Hg.) GC purity>98%. MS: m/e 380 (10.9%, M), m/e 111 (0.9%, M—$C_5F_{11}$), m/e 61 (13.5%, M—$C_6F_{13}$), m/e 47 (100%, $H_2C$=$SH^+$).

A 500 mL round bottom flask equipped with a water-cooled condenser, a magnetic stirrer, and a nitrogen inlet was charged with 2-hydroxyethyl acrylate (23.24 g, 200.0 mmol), alkanethiol (IIId) (0.8 g, 10.0 mmol), and AIBN (0.05 g, 0.26 mmol). With constant stirring, the mixture was de-oxygenated by blowing a fine stream of dry nitrogen over the solution surface for 10 minutes. The reaction flask was then lowered into a 65° C. oil bath. Polymerization was carried out at 65° C. with stirring for 20 min. Unreacted taxogen and telogen were removed by vacuum distillation (0.5 mm) in 70° C. oil bath temperature to give 26.0 g of telomer (Id). $^1$H-NMR integration indicated the average degree of polymerization was 7.2. GPC (with THF as the mobile phase and polystyrene standards) gave $M_n$ 1900 and $M_w$ 3700.

Those skilled in the art will appreciate that the preceding synthetic procedures for the preparation of specific halides (IV), alkanethiols (III), and telomers (I) are illustrative and may be adapted to the preparation of other halides (IV), alkanethiols (III), and telomers (I). The properties of telomers made by the above procedures or adaptations thereof are summarized in Table I below:

TABLE I

| Telomer[a] | Taxogen:Telogen (molar feed ratio) | Degree of Polymerization[b] | $M_n$[c] | $M_w$[c] | Miscibility with Water[d] |
|---|---|---|---|---|---|
| Ia | 100:26 | 2.7 | 800 | 1950 | Partially soluble |
|  | 100:13 | 7.3 | 680 | 2220 | Clear solution |

TABLE I-continued may cause stress-clearing of the liquid crystal composite.) Comparative results are summarized in Table II.

TABLE II[a]

| Telomer (% w/w) | Avg. Thickness (μm) | VHR | $E_{90}$ (v/μm) | CR | FOM | Hysteresis (msec) | Rise Time (msec) | Fall Time (msec) |
| --- | --- | --- | --- | --- | --- | --- | --- | --- |
| None (control) | 9.4 | 93.0 | 0.81 | 18.44 | 0.20 | 40.8 | 47.5 | 131.8 |
| Ia[b] (0.1) | 10.5 | 96.6 | 0.95 | 23.93 | 0.19 | 14.8 | 37.3 | 55.5 |
| Ia[b] (0.2) | 10.1 | 96.2 | 1.04 | 22.07 | 0.17 | 14.5 | 34.0 | 57.2 |
| Ic[c] (0.1) | 8.9 | 96.5 | 0.84 | 18.74 | 0.20 | 24.2 | 42.7 | 78.2 |
| Id[d] (0.1) | 10.3 | 95.5 | 0.84 | 24.60 | 0.23 | 38.4 | 44.6 | 98.1 |

[a]Data points are average of four runs.
[b]Degree of polymerization 7.3, $M_n$ 1200.
[c]Degree of polymerization 26, $M_n$ 1950.
[d]Degree of polymerization 5.

| Telomer[a] | Taxogen: Telogen (molar feed ratio) | Degree of Polymerization[b] | $M_n^c$ | $M_w^c$ | Miscibility with Water[d] |
| --- | --- | --- | --- | --- | --- |
|  | 100:13 | 7.3 | 1200 | 2860 | Clear solution |
|  | 100:13[e] | 8.2 | 620 | 2810 | Clear solution |
| Ib | 100:15 | 5.9 | 950 | 2030 | Clear solution |
|  | 100:25 | 3.9 | — | — | Clear solution |
| Ic | 100:13 | 11 | — | — | Milky suspension |
|  | 100:4.5 | 13 | — | — | Partially soluble |
|  | 100:2.2 | 26 | 1950 | 3930 | Clear solution |
| Id | 100:13 | 3.5 | 1170 | 2760 | Clear solution |
|  | 100:10[f] | 4.0 | 1360 | 2850 | Clear solution |
|  | 100:10[g] | 5.0 | — | — | Clear solution |
|  | 100:5 | 7.2 | 1900 | 3700 | Clear solution |

[a]All telomers were water clear, viscous liquids at ambient temperature.
[b]Measured by $^1$H-NMR integration.
[c]Measured by GPC with THF as the mobile phase and polystyrene standards.
[d]Physical appearance of 5 wt % in water.
[e]Polymerization occurred at room temperature at the end of 15 min deoxygenation.
[f]Bulk polymerization; telogen did not completely dissolve in taxogen.
[g]Solution polymerization with $CH_2Cl_2$ as co-solvent.

EXAMPLE 5

This example describes the preparation of liquid crystal composite light valves including a telomer (I) as a coating aid.

A master batch of liquid crystal composite emulsion was prepared by blending 100 part per hundred by weight (phr) liquid crystal material (TL205, Merck) with 20 phr of an UV cureable formulation (PN393, Merck) in a 10% aqueous solution of PVA (Vinol TM 205, Air Products). The emulsion was exposed to UV light for a pre-curing treatment. Aliquots of the pre-cured emulsion were withdrawn from the master batch and 0.1% by weight of a telomer was added. The emulsion was coated onto an ITO electrode supported on a glass substrate. The coatings were exposed to UV light for a post-curing treatment. After the emulsion was dried, an ITO counterelectrode was laminated on top.

Control samples (that is, samples to which no telomer (I) was added) gave irregular coatings, suggesting inadequate wetting. Samples containing telomer (I) were substantially superior visually. Further, samples containing telomer (I) were self-laminating to the counterelectrode, meaning that they did not require pressure to cause lamination. (Pressure is undesirable because it As can be seen from the above data, telomers (I) do not detrimentally affect the electro-optical properties of the light valves. In some instances they actually improve the electro-optical properties. Generally, the voltage holding ratio (VHR) and the operating field ($E_{90}$) are marginally improved. Telomers (Ia) and (Id) increase the contrast ratio by about 30%. Telomer (Ia) substantially improves switching speed. Both the rise and fall times are improved compared to the control.

EXAMPLE 6

This example compares telomers of this invention as coating aids for liquid crystal devices compared to commercially available prior art fluorinated surfactants.

An emulsion was prepared by blending 100 phr of liquid crystal material (TL205, Merck), 20 phr of an UV curable formulation PN393 (Merck) with 2 phr of trimethylolpropane trimethacrylate (Polyscience) in a 10% aqueous solution of PVA (Vinol TM 205, Air Products). The ratio of liquid crystal material to PVA is 90:10 w/w. The emulsion was exposed to 3° C. nitrogen stream for 30 min before UV curing at 11 mW/cm$^2$ and 2° C. for 5 minutes. The emulsion was centrifuged and the aqueous solution was discarded. The pellet was again emulsified in a 10% aqueous solution of polyurethane (Neorez R9677, ICI Resins). The ratio of liquid crystal material to Neorez was 90:10 w/w. Aliquots of the emulsion were withdrawn from this master batch and 0.1% by weight of telomer Ia (degree of polymerization 7.3, $M_n$ 1200), 0.1% by weight of Ic (degree of polymerization 26, $M_n$ 1950), 0.1% by weight of telomer Id (degree of polymerization 4, $M_n$ 1170), or Zonyl FSO (a fluorinated surfactant from Du Pont) was added. The emulsion was coated onto an ITO electrode. After the emulsion was dried, an ITO counter electrode was laminated on top.

Control samples (that is, samples to which no telomers (I) or Zonyl FSO was added) containing gave irregular coatings with defects, suggesting inadequate wetting. Samples containing 0.1% by weight of Ic did not improve the quality of coating or lamination as much as samples containing Ia, Id, or Zonyl FSO, but nevertheless exhibited improved coating and lamination quality compared to the control samples. Samples containing telomer (Ia), (Id), or Zonyl FSO were substantially superior visually, resulting in better laminations and reduced stress clearing. Comparative results are summarized in Table III.

TABLE III[a]

| Surfactant (% w/w) | Avg. Thickness (μm) | VHR | $E_{90}$ (v/μm) | CR | FOM | Hysteresis (msec) | Rise Time (msec) | Fall Time (msec) |
| --- | --- | --- | --- | --- | --- | --- | --- | --- |
| None (control) | 9.3 | 97.0 | 0.86 | 23.56 | 0.24 | 20.5 | 41.1 | 61.9 |
| Ia (0.1) | 11.4 | 96.1 | 1.00 | 32.72 | 0.23 | 18.8 | 36.2 | 54.0 |
| Ic (0.1) | 6.7 | 97.1 | 1.09 | 16.18 | 0.18 | 16.9 | 31.3 | 57.8 |
| Id (0.1) | 7.4 | 96.6 | 1.06 | 22.34 | 0.23 | 22.1 | 36.4 | 58.9 |
| Zonyl FSO (0.01) | 13.6 | 83.1 | 1.51 | 21.90 | 0.087 | 6.5 | 19.7 | 60.5 |
| Zonyl FSO (0.1) | 9.3 | 51.5 | 1.91 | 15.20 | 0.074 | 8.1 | 11.9 | 47.8 |
| Zonyl FSO (0.5) | 7.7 | 72.5 | 0.85 | 21.06 | 0.26 | 25.7 | 51.0 | 72.0 |

[a]Data points are average of 3–5 runs.

As can be seen from the data, telomers Ia, Ic, and Id do not detrimentally affect the electro-optical properties of the light valves. In some instances they actually improve the electro-optical properties. Samples with Zonyl FSO at low concentration (0.01 and 0.1% by weight) exhibit inferior $E_{90}$ and very low figure of merit (FOM). Zonyl FSO at 0.5% by weight, however, improves $E_{90}$ and FOM but it also lowers the rise time and fall time. In general, samples with Zonyl FSO exhibit voltage holding ration (VHR) below 85%, compared to values above 90% for telomers of this invention.

EXAMPLE 7

This example relates to the effect of telomer concentration on the electro-optical properties of the resulting liquid crystal devices.

An emulsion was prepared by blending 100 phr of liquid crystal material (TL205, Merck), 20 phr of UV curable formulation PN393 (Merck) with 2 phr of trimethylolpropane trimethacrylate (Polyscience) in a 10% aqueous solution of PVA (Vinol TM 205, Air Products). The ratio of liquid crystal material to PVA was 90:10 w/w. The emulsion was exposed to a 3° C. nitrogen stream for 30 min prior to UV curing at 11 mW/cm² and 2° C. for 5 minutes. The emulsion was centrifuged and the aqueous solution was discarded. The pellet was again emulsified in a 10% aqueous solution of a 50/50 blend of polyurethane (Neorez R9677, ICI Resins) and PVA (Vinol TM 205, Air Products). The ratio of liquid crystal material to Neorez R9677 was 90:10 w/w. Aliquots of the emulsion were withdrawn from this master batch and 0.1% or 0.5% by weight of telomer Id (degree of polymerization 5) was added. The emulsion was coated onto an ITO electrode. After the emulsion was dried, an ITO counter electrode was laminated on top.

The coating quality of samples containing telomer Id was substantially superior visually. Further, samples containing telomer Id were selflaminating, meaning that they did not require pressure to cause lamination, avoiding the stress clearing problem. The use of 0.1% or 0.5% of (Id) did not make any difference in the quality of coating and lamination. Comparative results are summarized in Table IV.

TABLE IV[a]

| Telomer (% w/w) | Avg. Thickness (μm) | VHR | $E_{90}$ (V/μm) | CR | FOM | Hysteresis (msec) | Rise Time (msec) | Fall Time (msec) |
| --- | --- | --- | --- | --- | --- | --- | --- | --- |
| None (control) | 8.0 | 96.4 | 1.02 | 24.47 | 0.25 | 25.1 | 41.3 | 58.7 |
| Id (0.1) | 9.5 | 95.9 | 1.02 | 32.45 | 0.27 | 23.8 | 37.8 | 52.1 |
| Id (0.5) | 6.4 | 93.2 | 0.91 | 15.82 | 0.22 | 19.5 | 47.5 | 61.8 |

[a]Data points are average of 3–5 runs.

EXAMPLE 8

Using procedures analogous to those described in Example 7 above, a study of the effect of concentration of telomer Ia on the electro-optical properties of light valves was performed. The results are provided in Table V.

TABLE V[a]

| Telomer (% w/w) | Avg. Thickness (μm) | VHR | $E_{90}$ (V/μm) | CR | FOM | Hysteresis (msec) | Rise Time (msec) | Fall Time (msec) |
| --- | --- | --- | --- | --- | --- | --- | --- | --- |
| None (control) | 9.4 | 93.0 | 0.81 | 18.44 | 0.20 | 40.8 | 47.5 | 131.8 |
| Ia (0.1) | 10.5 | 96.6 | 0.95 | 22.93 | 0.19 | 14.8 | 37.3 | 55.5 |
| Ia (0.2) | 10.1 | 96.2 | 1.04 | 22.07 | 0.17 | 14.5 | 34.0 | 57.2 |
| Ia (2.0) | 9.7 | 73.6 | 0.89 | 19.24 | 0.18 | 10.9 | 35.9 | 64.3 |

[a]Data points are average of 4 runs.

EXAMPLE 9

Following the synthetic principles disclosed above, telomers Ie–Ii were synthesized and characterized. Their properties are summarized in Table VI.

TABLE VI

| Telomer | Taxogen:Telogen (molar feed ratio) | Degree of polymerization[a] | Physical appearance | Miscibility in water (5 wt %) |
| --- | --- | --- | --- | --- |
| Ie | 100:13 | 4.1 | Colorless | Insoluble |

TABLE VI-continued

| Telo-mer | Taxogen:Telogen (molar feed ratio) | Degree of polymerization[a] | Physical appearance | Miscibility in water (5 wt %) |
|---|---|---|---|---|
| | 100:6.4 | 5.4 | solid, clear & brittle Colorless solid, clear & brittle | Partially soluble |
| If | 100:10 | 4.2 | Colorless solid, clear & brittle | Partially soluble |
| | 100:5 | 5.4 | Colorless solid, clear & brittle | Milky suspension |
| Ig | 100:10 | — | Colorless solid, clear & brittle | Insoluble |
| Ih | 100:5 | 7.1 | Viscous liquid, colorless & clear | Partially soluble |
| Ii | 100:5 | 13.6 | Viscous liquid, colorless & clear | Partially soluble |
| Ij | 100:13.3 | 6.0 | Viscous liquid, colorless & clear | Completely miscible |

[a] By $^1$H-NMR integration.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of making a liquid crystal light valve, comprising the steps of:
   (a) providing an emulsion comprising plural discrete volumes of a liquid crystal material encapsulated in a matrix material carried in an aqueous carrier medium, the emulsion further comprising a telomer of the structure

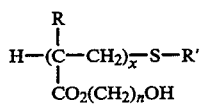

where R is —CH$_3$ or H; R' is a C$_5$ to C$_{18}$ alkyl or fluoroalkyl group; n is an integer between 2 and 6 inclusive; and x is an integer between 3 and 26 inclusive;
   (b) applying a coating of the emulsion onto a first electrode material supported by a first substrate;
   (c) drying the coating by permitting the aqueous carrier medium to evaporate; and
   (d) laminating onto the dried coating a second electrode material supported by a second substrate.

2. A method according to claim 1, wherein, in the telomer, the integer n is 2 or 3.

3. A method according to claim 1, wherein, in the telomer, the group R' is a linear or branched C$_9$ to C$_{16}$ alkyl group or a fluoroalkyl group of the structure —CH$_2$CH$_2$(CF$_2$)$_m$F, where m is an integer between 4 and 10, inclusive.

4. A method according to claim 1, wherein the telomer has the structure

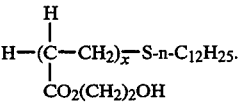

5. A method according to claim 1, wherein the telomer has the structure

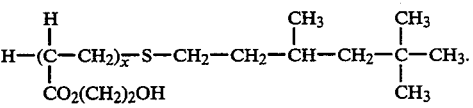

6. A method according to claim 1, wherein the telomer has the structure

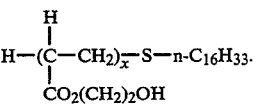

7. A method according to claim 1, wherein the telomer has the structure

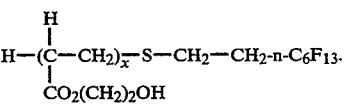

8. A method according to claim 1, wherein the telomer is selected from the group consisting of

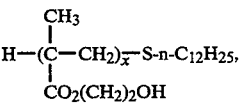

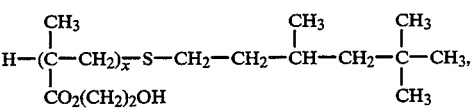

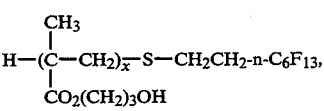

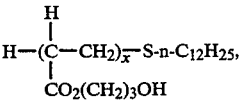

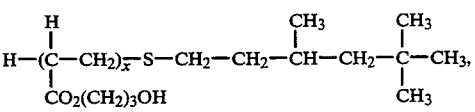

and

-continued

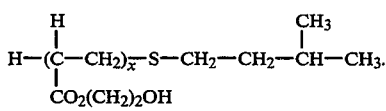

9. A method according to claim 1, wherein the liquid crystal material is operationally nematic and has a positive dielectric anisotropy.

10. A method according to claim 1, wherein the carrier medium is water or a water-alcohol combination.

11. A method according to claim 1, wherein the telomer is present in the emulsion in an amount between 0.10 and 2.00% w/w.

12. A method according to claim 1, wherein the matrix material is selected from the group consisting of poly(vinyl alcohol) and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, and vinyl polymers.

* * * * *